Figure 2:
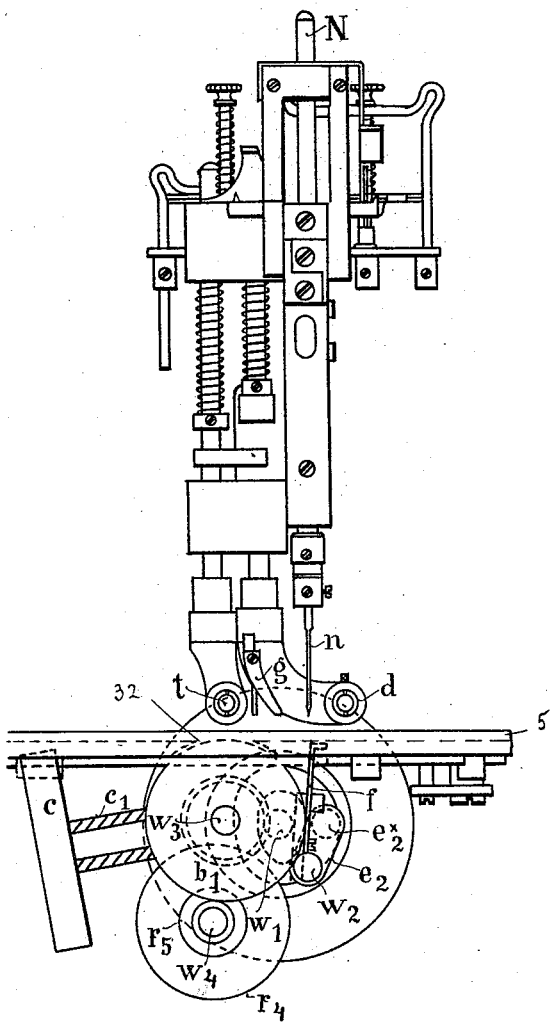

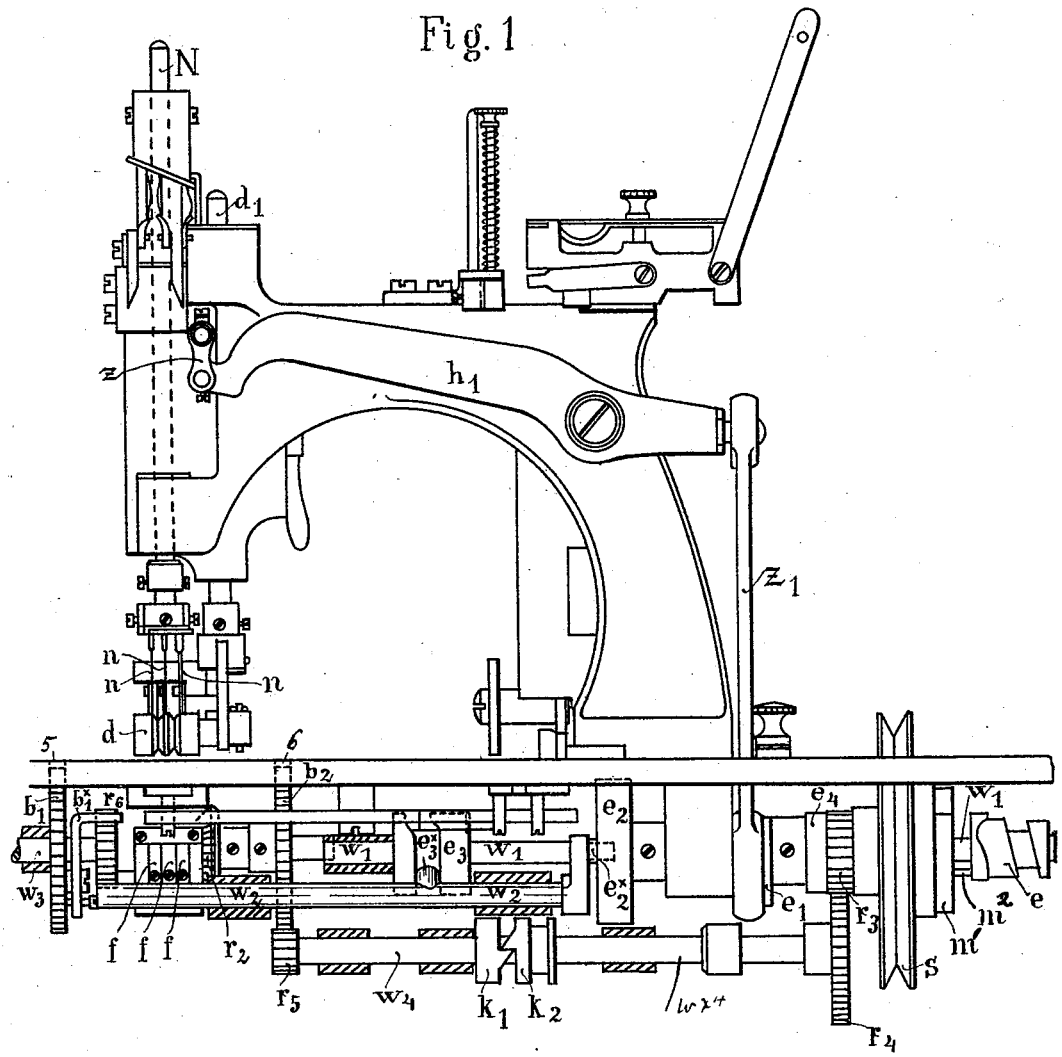

(No Model.)
G. E. KOTT.
SEWING MACHINE.
No. 543,832. Patented July 30, 1895.
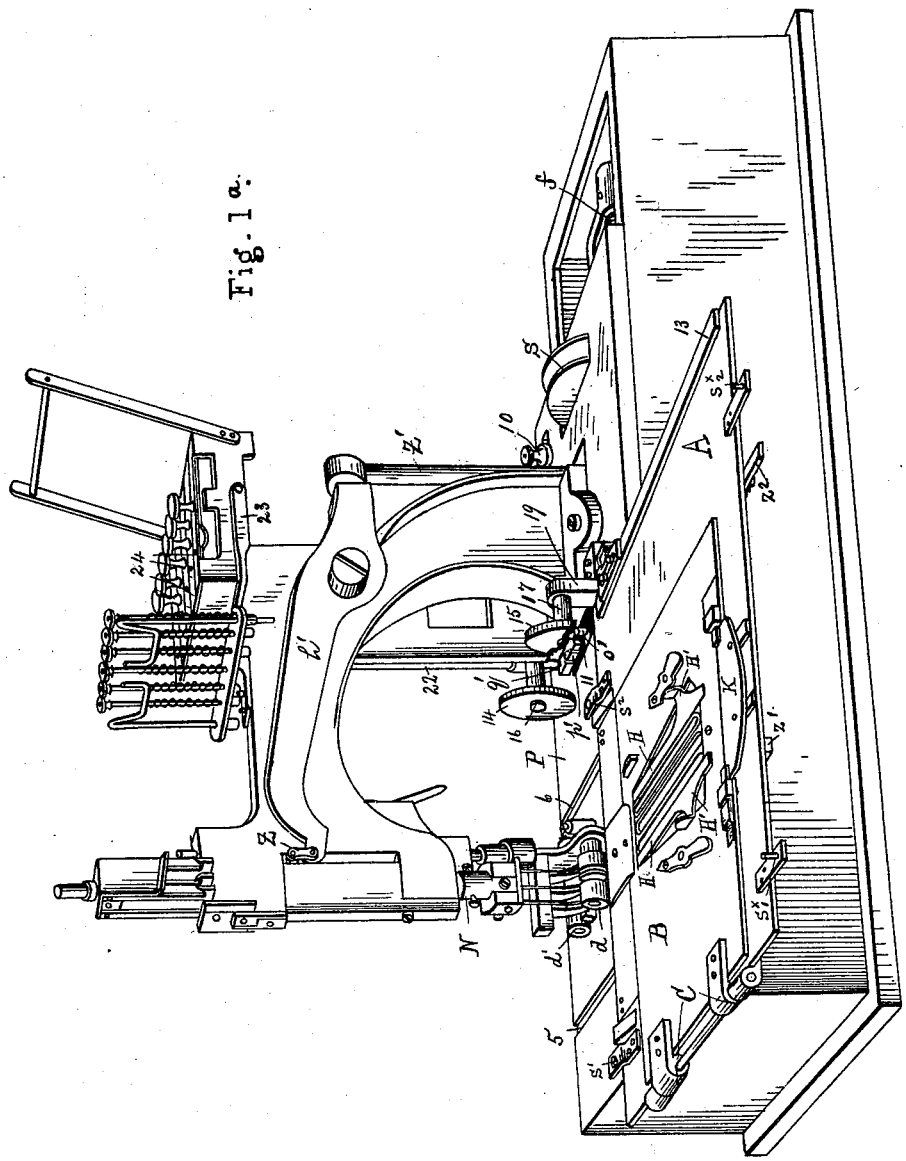
Fig. 1ᵃ.
WITNESSES
INVENTOR (No Model.) 8 Sheets—Sheet 3.

G. E. KOTT.
SEWING MACHINE.

No. 543,832. Patented July 30, 1895.

Witnesses
J. D. Gapling
Will S. Thomas

Inventor
Gustav E. Kott
By J. Dillman
Atty (No Model.) 8 Sheets—Sheet 4.

G. E. KOTT.
SEWING MACHINE.

No. 543,832. Patented July 30, 1895.

Witnesses

Inventor
Gustav E. Kott (No Model.) 8 Sheets—Sheet 5.

G. E. KOTT.
SEWING MACHINE.

No. 543,832. Patented July 30, 1895.

Witnesses:

Inventor
Gustav E. Kott
By G. Dittmar,
Atty (No Model.) 8 Sheets—Sheet 6.
G. E. KOTT.
SEWING MACHINE.
No. 543,832. 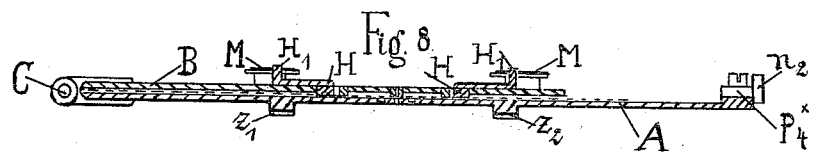 Patented July 30, 1895.
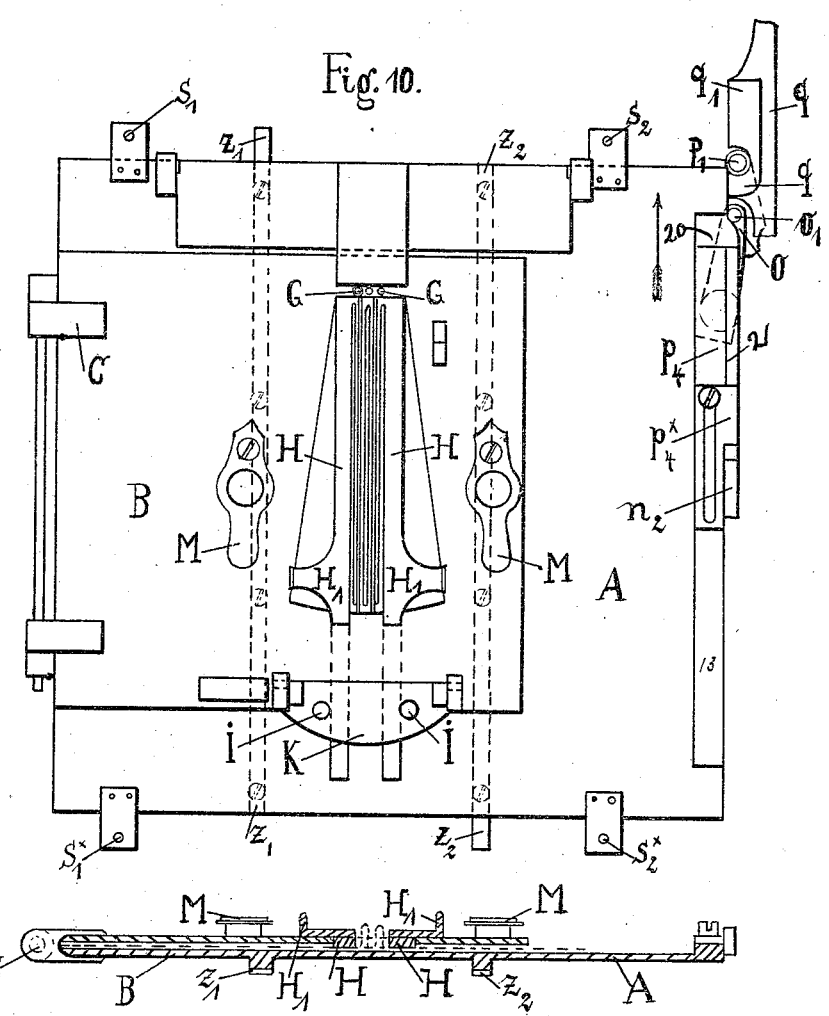

(No Model.) 8 Sheets—Sheet 7.
G. E. KOTT.
SEWING MACHINE.
No. 543,832. Patented July 30, 1895.
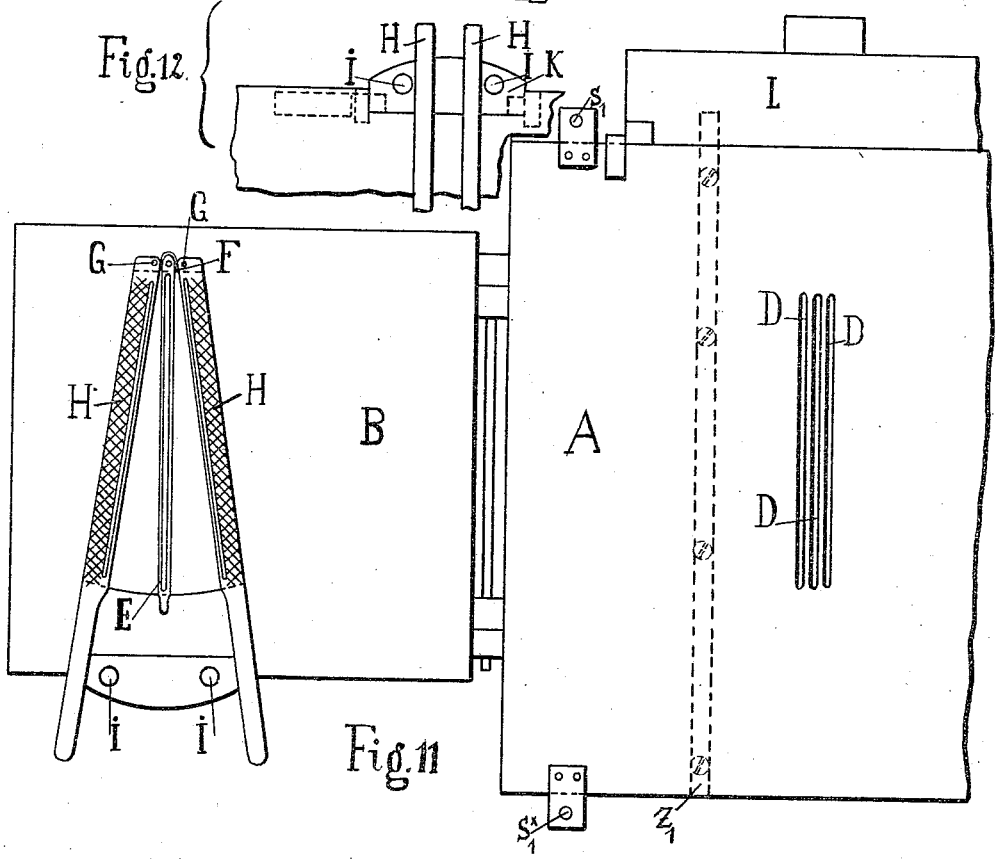
Witnesses:
J. D. Caplinger
Will S. Thomas
Inventor
Gustav E. Kott,
By J. Dittmar,
Atty.

(No Model.) 8 Sheets—Sheet 8.

G. E. KOTT.
SEWING MACHINE.

No. 543,832. Patented July 30, 1895.

WITNESSES
H. N. Jenkins
H. J. Wetmore

INVENTOR
G. E. Kott
by G. Dittmar,
Attorney

UNITED STATES PATENT OFFICE.

GUSTAV ERNST KOTT, OF CHEMNITZ, GERMANY, ASSIGNOR TO BERNHARD KOHLER, OF SAME PLACE.

SEWING-MACHINE.

SPECIFICATION forming part of Letters Patent No. 543,832, dated July 30, 1895.

Application filed April 25, 1894. Serial No. 508,989. (No model.) Patented in England November 19, 1892, No. 21,036.

*To all whom it may concern:*

Be it known that I, GUSTAV ERNST KOTT, a subject of the King of Saxony, residing at Chemnitz, Germany, have invented certain new and useful Improvements in Glove-Sewing Machines, (for which, with my knowledge and consent, Bernhard Köhler has received Letters Patent in England, No. 21,036, dated November 19, 1892;) and I do hereby declare the following to be a full, clear, and exact description of the invention, such as will enable others skilled in the art to which it appertains to make and use the same.

This invention relates to improvements in sewing-machines, and has for its object the simultaneous production of several diverging lines of stitching, the special object being to ornament glove-backs and other like articles.

This invention further relates to improvements in the operative mechanism of sewing-machines, the parts of which are arranged and combined so as to insure an automatic connection and disconnection of certain elements to cause the needle-bar and stitching mechanism to cease operation the moment the requisite length of stitching has been accomplished, the movement of the aforesaid parts being arrested while the needle-bar is in its elevated position, at which time other elements are automatically brought into play, changing the feed from an intermittent to a speedy continuous movement, thus enabling the work-carrier to be run through the machine at a step-by-step movement during the sewing operation and at an increased continual movement while being conveyed to the needles or from the needles after the completion of the stitching.

The different changes and movements above mentioned are effected and controlled through the instrumentality of the work-carrier, as hereinafter described.

My invention is clearly illustrated in the accompanying drawings, whereon—

Figure 3:
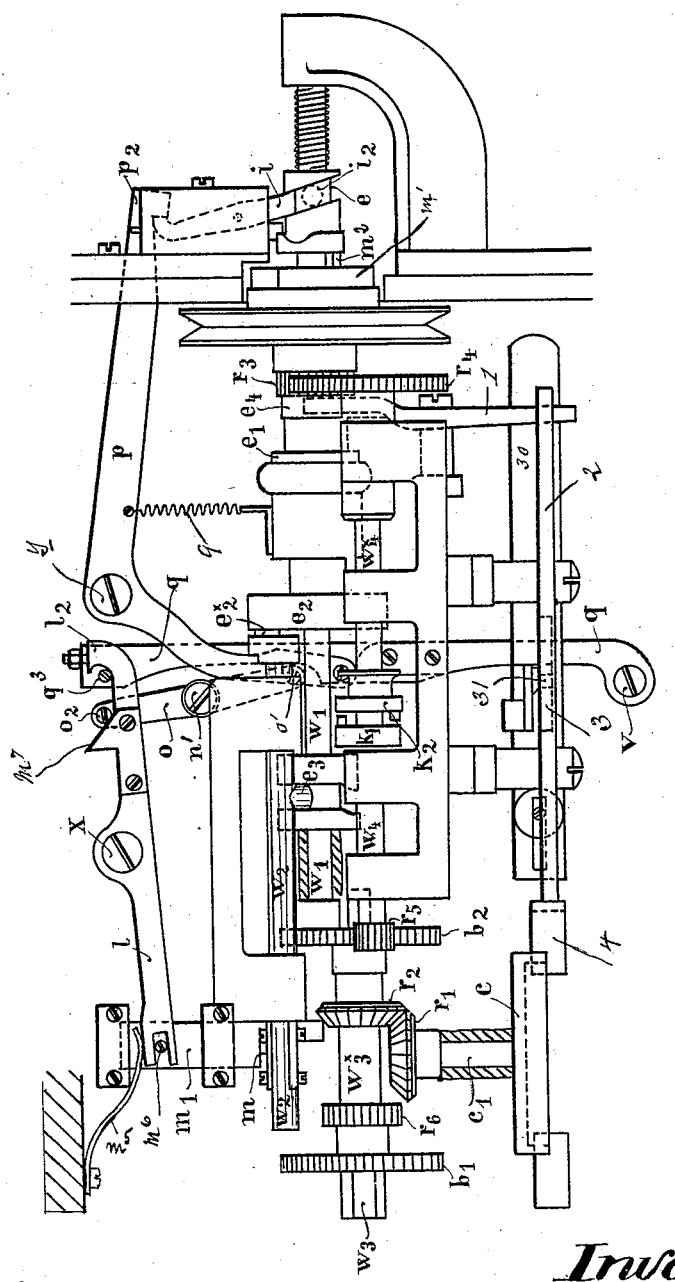
Figure 5:
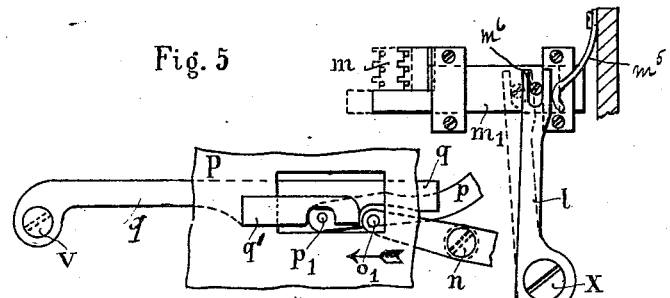
Figure 4:
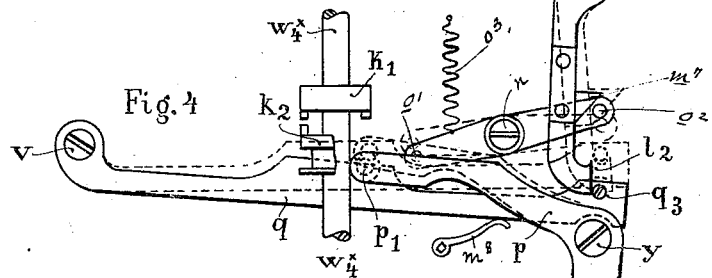
Figure 6:
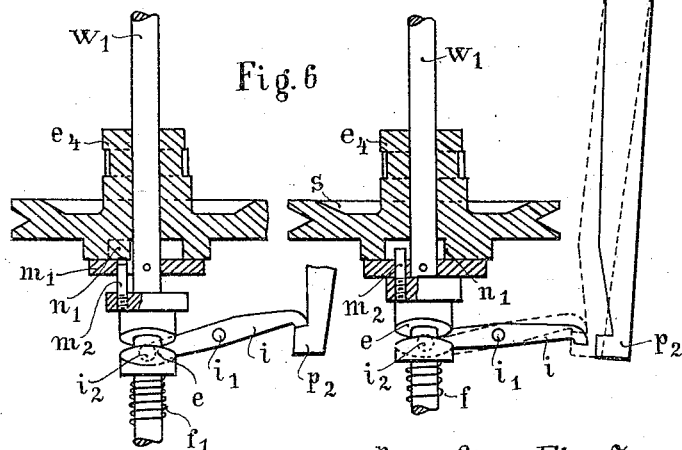
Figure 7:
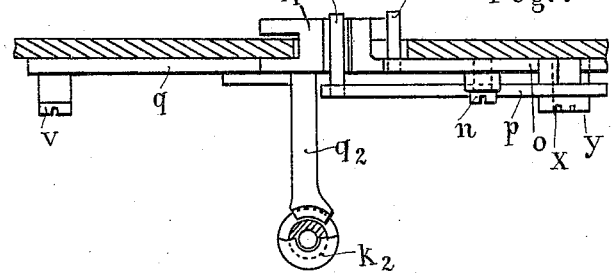
Figures 14, 15, 16:
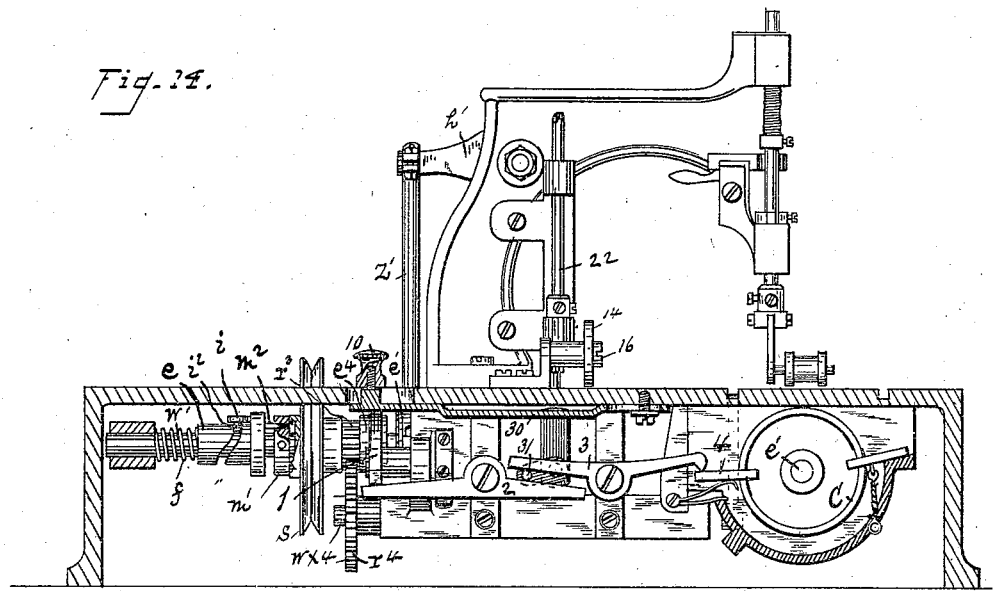

Figure 1$^a$ represents a perspective view of the machine and work-carrier. Fig. 1 is a front elevation of the machine with the work-carrier omitted. Fig. 2 is an end view thereof. Fig. 3 is a view of the under side of the mechanism located within the machine bed-plate. Fig. 4 is a similar view showing the disengaging mechanism as well as the parts to be connected. Fig. 5 represents parts of the disengaging-levers, with trip ends projecting upward through an opening in the top of the bed-plate. Fig. 6 shows the grooved pulley or driving-wheel partly broken away, with portion of shaft and disconnected mechanism, as when the sewing devices are at rest. Fig. 7 is a side view of the levers shown at Fig. 5 with the bed-plate represented in sectional lines. Fig. 8 is a transverse section of the work-carrier, as when folded, and with glove material represented in dotted lines within same. Fig. 9 is a similar view of the work-carrier with a glove-back clamped therein. Fig. 10 is a top view of the work-carrier closed and ready for connection with the sewing-machine. Fig. 11 represents the work-carrier as when open, the view showing the inner surfaces of each plate. Figs. 12 and 13 are fragmentary sections of the work-carrier. Fig. 14 is a rear view of the machine, partly in section, illustrating the construction and relation of the operating-levers of the feed mechanism. Fig. 15 is a detail view showing the arrangement for imparting to the hook-shaft of the machine an endwise movement. Fig. 16 is an enlarged perspective view of a portion of the work-carrier and device connected therewith for operating the levers, whereby the movements of the machine are changed as required.

As in other machines, the needle-lever $h'$ is pivoted near the rear upper portion of the machine-arm, so that its forward end shall connect by link $z$ with the needle-bar N and its rear end by rod $Z'$ with an eccentric $e'$, secured on the main shaft $w'$, on which is loosely fitted the driving-wheel S.

To the inner part of the main shaft $w'$ are secured wheels $e^2$ and $e^3$, (see Figs. 1 and 3,) each wheel provided with a cam-groove, the groove of $e^2$ formed at its inner side and the groove of $e^3$ made in the periphery thereof. These grooves are respectively engaged by an arm $e^{2\times}$ and friction-roller $e^{3\times}$, the arm $e^{2\times}$ being secured to the inner end of a shaft $w^2$ and the friction-roller $e^{3\times}$ being fitted onto stud projecting from the side of the shaft $w^2$, so that the said shaft and the hooks $f f f$, connected with the outer end thereof, shall alternately operate in an endwise and rocking manner during the stitching process.

The intermittent-feed mechanism is about the same as in other sewing-machines, and consists of a cam $e^4$, (see Figs. 1, 3, and 6,) secured to or forming part of the driving-wheel S, and an intermediate pinion $r^3$, so as to turn with the shaft at certain times only, a rocking lever 1, pivotally arranged at right angles to the aforesaid shaft, (see Fig. 3,) so that one of its ends shall rest on the upper surface of the cam $e^4$ and its opposite end upon the rear arm of a rocking lever 2, the latter arranged at right angles with the lever 1 and having its other end projecting under the rear arm of a rocking lever 3, the forward end of which connects with a lever 4, through which motion is imparted to the friction or ratchet wheel $c$, shaft $c'$, and bevel-pinion $r'$, secured to the inner end of said shaft, so as to engage a bevel-pinion $r^2$, forming part of a sleeve $w^{3\times}$, which is loosely mounted on the shaft $w^3$. The sleeve $w^{3\times}$ is also provided with a ratchet-wheel $r^6$, the teeth of which are engaged by a spring-pawl $b^{\times\prime}$, connected with feed-wheel $b'$, as shown in Fig. 1, so as to operate the said wheel $b'$, its companion wheel $b^2$, and the shaft $w^3$, on which said wheels are mounted.

The intermittent feed is adjusted by the usual mechanism through the instrumentality of handle 10, (see Fig. 1$^a$,) which is adapted to operate in an elongated slot in the top of the bed-plate, as in other machines, the said mechanism consisting of a sliding plate 30, (see Figs 3 and 14,) carrying a pin 31, which is adapted to operate between the adjacent arms of the levers 2 and 3, and thus form a movable bearing, whereby the stroke of the ratchet-lever is increased or diminished and the length of the stitches altered, as required.

The parallel grooves 5 and 6 of the bed-plate are each provided with a bottom opening, as shown in dotted lines at 32, Fig. 2, to allow the feed-wheels $b'$ $b^2$ to operate therein and engage the racks $z^2$ $z^3$ of the work-carrier.

As the means employed for changing the feed embraces the work-carrier, it is thought best, before entering into a detailed description of either, to describe the mechanism whereby a continuous feed is produced, and for which purpose the loosely-fitted driving-wheel S is provided at one side thereof, as previously mentioned, with a pinion $r^3$, the teeth of which engage those of a wheel $r^4$, that is keyed or otherwise secured to one end of short shaft $w^{\times 4}$, the other end of said shaft being provided with a sliding clutch $k^2$, which is adapted to engage, at certain times, a clutch $k'$, that is secured to shaft $w^4$, the latter carrying a pinion $r^5$, which engages the feed-wheel $b^2$, as shown in Figs. 1, 2, and 3, and thus operates the shaft $w^3$ and companion-wheel $b'$. The spring-pawl $b^{\times\prime}$ of the latter, passing over the teeth of the ratchet-wheel $r^6$, allows said wheel, with its connecting-sleeve and bevel-gearing, to remain idle during the operation of the continuous feed.

The driving-wheel S is provided at its outer side with a recess, which, with the exception of a stop $n'$, extends around the bore thereof. A plate or collar $m'$ is fitted over the recessed part of driving-wheel and secured to the shaft thereof by a pin, as shown in Fig. 6. The collar $m'$ is provided with a perforation within which a pin $m^2$, projecting inwardly from a cam $e$, (see Fig. 3,) is adapted to operate, and thus through the instrumentality of the coil-spring $f$ normally lock together the driving-wheel and shaft.

The unlocking is effected by a lever $i$, fulcrumed at $i'$, so that a friction-roller $i^2$ at the inner end of the lever shall operate in the groove of cam $e$. The bend or hook is formed at the outer end of the lever $i$, adapting same to be engaged by the catch $p^2$ of a right-angle lever $p$, fulcrumed at $y$ and having its inner end provided with a pin $p'$ projecting upwardly through an opening 11 in the bed-plate. A spring 9 connects the outer arm of lever $p$ with an inner part of the bed-plate for the purpose of keeping the extremity of the said arm in contact with the lever $i$ when not thrust aside by the action of the work-carrier against the upwardly-projecting pin $p'$ of said lever.

The means for disconnecting the continuous feed consists of the lever $q$, fulcrumed at $v$, the said lever being provided with an upper projecting block or shoe $q'$, adapted to operate in the recess 11 of the bed-plate, and a downwardly-projecting arm $q^2$, the lower end of which rests in the grooved portion of clutch $k^2$. The shoe or block $q'$ is adapted to be thrust aside by the work-carrier during its travel across the machine.

A knife $m$, connected with a sliding bar $m'$, is adapted to operate below the needle-openings in the bed-plate to cut the sewing-threads at the completion of the stitching of each article. A spring $m^5$ (see Figs. 3 and 4) is fitted between the adjacent sides of the bed-plate, and the rear end of the knife $m$ or the lever $l$ connected therewith, for the purpose of driving the knife forward to cut the threads at the proper time, as hereinafter described.

Before the stitching process begins the knife is moved back out of line of the needles by means of levers $l$ $o$, the former fulcrumed at X and having a slotted end to engage a pin $m^6$ on the knife-bar and a beveled projection $m^7$ near its opposite end, as shown in Figs. 3 and 4, for engagement with the pin $o^2$ of lever $o$, the latter fulcrumed at $n'$ and provided at its opposite end with an upwardly-projecting pin $o'$ for operation in the recess 11 of the bed-plate, so as to be pushed aside by the work-carrier during the travel of the latter across the machine-top. The knife is held in its rearward position by a pin $q^3$ at the movable end of lever $q$, as shown in Fig. 4. The pin $q^3$ also serves to lock the levers $l$ and $q$ during the rapid feed of the machine, at which time the sewing devices are at rest.

The lever $o$ is provided with a spring $o^3$, (see Fig. 4,) whereby it is returned to its normal position when relieved of side pressure from the work-carrier. The lever $q$ is in like manner returned to normal position by a spring $m^8$, (see Fig. 4,) connected therewith or with its depending clutch-lever $q^2$.

The work-carrier consists of two rectangular plates A B, hinged together, as at C. The plate A is made somewhat larger than B and provided at its under side with two racks $z'$ $z^2$ adapted to operate in the grooves 5 6 of the machine-top and be engaged by the feed-wheels $b'$ $b^2$ located beneath same.

At opposite side to the hinge C the plate A is provided with a ledge 13, the inner edge of which is parallel with the racks $z'$ $z^2$. Idlers 14 15, journaled on pins 16 17 of block 18 19, operate on the plate A at the inner edge of the aforesaid ledge, and thus serve to steady the work-carrier during its movement across the machine.

The forward end of the ledge 13 is provided with a block 20, (see Fig. 10,) one side of which is beveled rearwardly to a straight projection 21, in order that when brought in contact with the upwardly-projecting pins or ends of the operating-levers the same may be pressed aside without jarring the parts connected therewith and with but little friction.

An adjustable block $p^{4\times}$, (see Fig. 10,) having a rearwardly-inclined top projection $n^2$, is adapted to fit over the straight part 21 and the adjacent portion of the ledge 13, in order that the levers may be held aside for a greater length of time, when desired, to permit of an increased length of stitching by the sewing devices.

In the onward movement of the work-carrier the inclined projection $n^2$ of the adjustable block $p^{\times 4}$ impinges against the lower end of a rod 22, which is arranged to operate vertically in bearings at the side of the machine-arm. The said rod serves as a support for the swinging portion of a pivoted frame 23, by which the tension devices 24 are simultaneously raised to relieve the sewing-threads of tension at such time as the thread-cutting device is brought into action, thereby preventing injury to the needles through any strain upon the threads thereof.

At requisite place the plate A is provided with three parallel slots D for the passage of the needles during the sewing process, and the upper plate B is provided with a trapezoidal opening, in the center of which is secured a slotted bar E, which in practice is adapted to fit over the central slot D of the lower plate A.

Slotted levers H H are fulcrumed at the narrowest part of the trapezoidal opening, as shown at G G, Figs. 10 and 11, with spring F located between same and the slotted bar E to press same outwardly, except at such time as their handles are held in parallel positions by the pins $i$ $i$ of a hinged plate, as shown at K.

The outer edges of the levers H H are provided with ears or lugs H' H', having upwardly-turned ends adapted to impinge against the handles of a pair of centrally-pivoted adjusting devices M M, whereby the spread of the aforesaid levers is regulated to suit the angles of stitching required.

The adjustment is made by means of set-screws, which are clearly shown in Fig. 10.

The under surface of the slotted bar E and levers H H are roughened or provided with file-cuts to engage the surface of the glove-back or other article to be stitched, and thus permit of the material being drawn toward the center and so held during the stitching process that while the needles operate in parallel lines the goods operated upon when opened out will contain diverging lines of stitching.

The forward and rear edges of the work-carrier are provided, respectively, with coupling devices, consisting of perforated plates $s'$ $s^2$ and pin-plates $s^{\times\prime}$ $s^{\times 2}$, in order that the carriers may be coupled together, and thus, when desired, be formed into continuous trains. The forward edge of the work-carrier is provided between the coupling plates thereof with a hinged plate L for the purpose of covering the projecting portion of the glove or other article to be stitched.

The work-carrier is held in close contact with the upper surface of the bed-plate by means of grooved rollers $d$ $d'$, which are journaled in the lower ends of presser-bars. (See Fig. 2.) The said rollers are grooved, as shown at Figs. 1$^a$ and 1, so as to ride over the upwardly-projecting folds produced in the glove-back by the clamping-levers of the work-carrier.

In the operation of my invention a glove-back or other article to be stitched is arranged in each work-carrier with the finished or dressed side thereof next to the base-plate A, in order that the stitching may appear on the said side of the goods. The devices M M are then adjusted by means of their set-screws to limit the opening of the levers H H, so that the spread of the diverging lines of stitching may be such as desired. The work-carrier is next placed on the bed-plate, with the racks of the former in the grooves of the latter, and pressed inward until the said racks have been engaged by the feed-wheels $b'$ $b^2$. The presser-bars are then lowered, so that their rollers may act against the upper surface of the work-carrier and the machine started. The carrier is first conveyed at a rapid continuous speed by reason of the feed-wheels $b'$ $b^2$ receiving motion through the coupled shafts $W^4$ $W^{\times 4}$ and gear-wheels $r^3$ and $r^4$, (see Fig. 1,) the intermittent feed in such case being disconnected. As the carrier moves forward the block 20 of the ledge 13 comes in contact with the pin $o'$ of lever $o$ and thrusts same aside, thereby causing the connecting mechanism to press back the knife, thus freeing the needle-openings of the bed-plate preparatory to the starting of the needle mechanism. Further movement of the work-carrier brings its block 20 in contact with the shoe $q'$ of lever $q$, and in pressing same aside forces the pin $q^3$ over the outer edge of the adjacent end of lever $l$, thereby securely locking said lever. The movement also disconnects the coupling-shafts $W^4$ $W^{4\times}$ and brings the intermittent feed into gear. The motion being transmitted from the main shaft through the cam $e^4$, the train of levers connecting same with the ratchet-wheel C, the bevel-wheels $r'$ $r^2$, sleeve $W^{3\times}$, and the ratchet wheel and pawl connected with wheel $b'$. Continued movement of the work-carrier causes its block 20 to press outward the pin $p'$ of lever $p$, thereby withdrawing the catch $p^2$ from lever $i$, releasing the tension of spring $f$ and causing the main shaft $W'$ to couple with the driving-wheel S, thus transmitting motion through eccentric $e'$ to the needle-bar and sewing mechanism. As the carriage passes onward the adjustable block thereof successively releases the pins $o'$ $p'$ and shoe $q$. The releasing of pin $p'$ throws the catch $p^2$ of lever $p$ against the outer end of lever $i$, where it is held by the action of spring 9. As the driving-wheel and main shaft revolve, the cam $e$, secured on said shaft, moves the lever $i$ until it is caught and locked by the catch $p^2$, when, by reason of the cam-groove, further revolution causes said cam to move outward and thus disconnect the driving-wheel from the main shaft, thereby arresting further movement of the sewing mechanism. As the block passes from contact with the shoe $q$ the rapid feed again begins. At same time the lever $l$ is released from contact with the pin $q^3$ of lever $q$, which causes the knife to be driven forward and thus sever the sewing-threads. The operation above described is repeated as often as other work-carriers are fed to the machine.

Having thus described my invention, what I claim as new, and desire to secure by Letters Patent, is—

1. In a sewing machine a bed-plate provided with parallel transverse grooves in the upper surface thereof, an opening in the bottom of each groove, feed wheels adapted to operate in the openings of the grooves, and a work carrier provided with parallel racks to operate in the aforesaid grooves and be engaged by the feed wheels, in combination with operating means for intermittently rotating the feed wheels, operating means for continuously rotating said feed wheels, and means for automatically connecting the said feed wheels first with one of said operating means and then with the other, for the purpose set forth.

2. The combination, in a sewing machine, of stitch-forming and thread-cutting mechanism, a bed plate provided with parallel-grooves in the top thereof, and feed wheels adapted to operate in the said grooves, a work-carrier with racks at the under side thereof, to operate in the bed plate grooves, as described, a lever for operating the thread-cutting mechanism, one side of the work-carrier being provided with a ledge having a bevel edge block and projection at the forward end thereof for engaging said lever for operating the thread-cutting mechanism, substantially as set forth.

3. The combination in a sewing-machine having a bed-plate provided with parallel grooves, openings in the bottom of each groove, and feed wheels to operate in said openings, a work carrier having racks to fit the grooves and be engaged by the aforesaid feed-wheels, a ledge at one side of the work-carrier, a beveled block at the forward end of the ledge and an adjustable block secured in rear of the beveled-block, with a series of levers and connecting mechanism whereby the feed is changed from an intermittent to a continuous motion, or vice versa, and the sewing-devices and thread cutting mechanism operated substantially as set forth.

4. In combination with a sewing-machine having transverse, recessed, grooves in the bed-plate thereof, and feed-wheels arranged to operate in same, a work-carrier provided with bottom racks to slide in the grooves and be engaged by the feed-wheels, the said carrier having a trapezoidal opening therein, a slotted bar in the center of said opening, a slotted lever pivoted at each side of the slotted bar, and springs between the pivotal ends of the levers and bar, with means for holding the levers in parallel positions, substantially as and for the purpose set forth.

5. The combination in a sewing-machine having a bed-plate provided with recessed-transverse grooves and feed-wheels arranged to operate therein, as described, a work-carrier composed of an upper and lower plate, the lower plate provided with racks to fit the aforesaid grooves and be engaged by the feed-wheels, and the upper-plate having a trapezoidal opening with slotted central-bar, a pivoted slotted bar at each side of the central-bar, the levers roughened on their under-sides to engage the material to be stitched and hold same in desired position, substantially as set forth.

In testimony whereof I affix my signature in presence of two witnesses.

GUSTAV ERNST KOTT.

Witnesses:
J. F. MONOGHAN,
OTTO THEUERKOM.